United States Patent [19]

Shimano

[11] 4,406,643
[45] Sep. 27, 1983

[54] DERAILLEUR FOR A BICYCLE

[75] Inventor: Keizo Shimano, Sakai, Japan

[73] Assignee: Shimano Industrial Company Limited, Osaka, Japan

[21] Appl. No.: 209,989

[22] Filed: Nov. 24, 1980

[30] Foreign Application Priority Data

Dec. 19, 1979 [JP] Japan .................. 54-166120

[51] Int. Cl.³ .......................... F16H 9/00; F16H 11/00
[52] U.S. Cl. ......................................... 474/82; 474/80
[58] Field of Search .................... 474/80, 82, 134, 139

[56] References Cited

U.S. PATENT DOCUMENTS

| | | | |
|---|---|---|---|
| 4,027,542 | 6/1977 | Nagano | 474/82 |
| 4,226,131 | 10/1980 | Yamasaki | 474/82 |
| 4,322,209 | 3/1982 | Shimano | 74/540 |

FOREIGN PATENT DOCUMENTS

| | | | |
|---|---|---|---|
| 1246447 | 8/1967 | Fed. Rep. of Germany | 474/82 |
| 896001 | 2/1945 | France . | |
| 2056593 | 3/1918 | United Kingdom | 474/82 |
| 167471 | 12/1921 | United Kingdom . | |
| 612814 | 11/1948 | United Kingdom . | |

Primary Examiner—Leslie A. Braun
Assistant Examiner—L. D. Shannon, III
Attorney, Agent, or Firm—Stevens, Davis, Miller & Mosher

[57] ABSTRACT

A derailleur for a bicycle, which is so constructed that a movable member is supported to a base member through two linkage members, a changeover frame having two pulleys carrying thereon a driving chain is pivoted to the movable member, and a tension spring is interposed between the movable member and the changeover frame, so that the tension spring exerts tension on the driving chain, said changeover frame being subjected to resistance against its swinging motion in a direction opposite to the working direction of the tension spring, thereby swinging the changeover frame easily in the direction of working of the changeover frame, while, requiring more force in the reverse direction to the working thereof, thereby making swinging of the changeover frame in the working direction of the tension spring easy and more difficult in the swinging motion direction opposite to the working direction of the spring.

8 Claims, 10 Drawing Figures

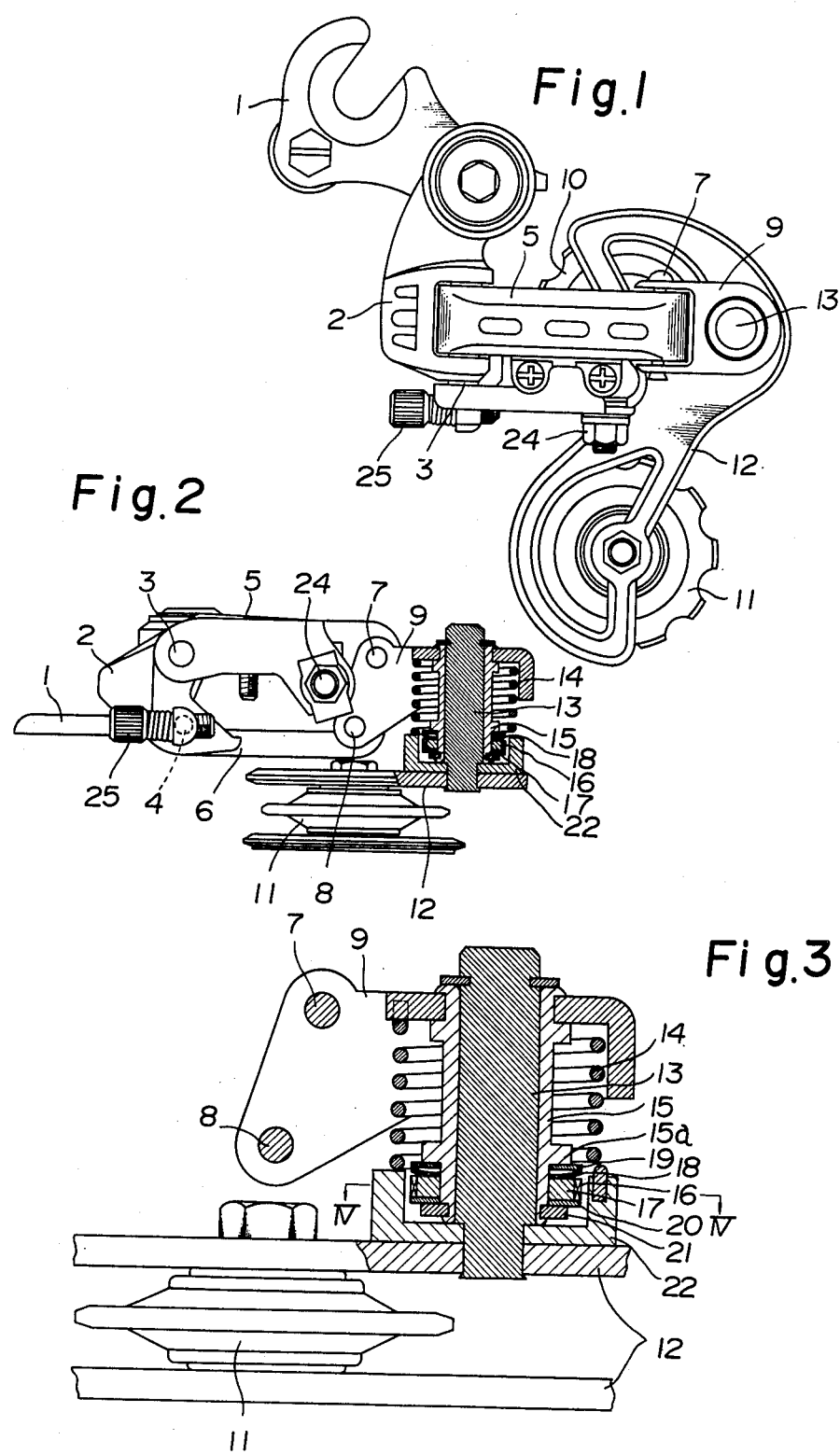

DERAILLEUR FOR A BICYCLE

FIELD OF THE INVENTION

This invention relates to a derailleur for a bicycle, and more particularly to a derailleur in which a base member supports a movable member through two linkage members and the movable member pivotally supports a changeover frame having two pulleys carrying a driving chain, so that when a control wire is operated to reciprocate the movable member, the driving chain is switched to a one of several multi-stage chain gears, thus changing the bicycle speed to a desired speed.

BACKGROUND OF THE INVENTION

Generally, this kind of derailleur provides a tension spring interposed between the movable member and the changeover frame, so that the tension spring always exerts tension on the driving chain when switched to any speed change stage.

When the tension spring, is weak, it cannot exert full tension on the driving chain, so that the slackened chain vibrates greatly at its slack side during the bicycle's running, resulting in the chain falling off a front gear.

On the other hand, a tension spring having a strong force exerts greater tension on the chain so as to cause a deflection in support shafts for front and rear gears carrying the chain. As a result, a large frictional resistance is generated at the relative-rotating portions between rotary members rotatable together with the front and rear gears and fixing members supporting the rotary members. Hence, the problem is created in that the front and rear gears develops a poor characteristic rotating and the relative-rotating portions increasingly wear and generate a large amount of noise. Also, a large tension spring force tension and large driving chain tension allow the chain to greatly large change in tension when switched at a stroke from the highest speed stage to the lowest and vice versa, resulting in poor speed change efficiency.

SUMMARY OF THE INVENTION

In the light of the above problems, this invention has been designed. An object of the invention is to provide a derailleur for a bicycle, which can reduce tension of the driving chain while slack in the chain is prevented. This invention is characterized in that the changeover frame is subjected to resistance against its swinging motion opposite to the working direction of the tension spring, whereby the changeover frame moves easily in its swinging motion in the working direction of the tension spring and with resistance in the swinging motion opposite to the working direction of the spring.

In detail, the derailleur of the invention is provided between a movable member and a changeover frame pivoted swingably thereto with a resistance applying means for applying to the changeover frame resistance against its swinging motion in a direction opposite to the working direction of the tension spring.

The resistance applying means mainly uses a unidirectionally rotational transmission which comprises a rotary member having an engaging recesses, such as ratchet teeth, in combination with an engaging member, such as a pawl, engageable with the recesses. The rotary member is combined with a friction means, e.g., a dish-shaped spring, which applies resistance against the rotation of the rotary member. The resistance applying means is incorporated in the pivotal portion of the changeover frame to the movable member, so that when the changeover frame in a reverse direction with respect to the working direction of the tension spring, the engaging member meshes with the engaging recesses at the rotary member to rotate the rotary member together with the changeover frame in swinging motion, thereby applying thereto the rotational resistance by the friction means, thus applying resistance to the swinging motion of the changeover frame. On the other hand, when the changeover frame swings in the working direction of the tension spring, the engaging member disengages from the engaging recesses, whereby the changeover frame swings freely with respect to the rotary member, thus lowering the resistance to the swinging motion.

Accordingly, a derailleur of the invention can employ a weak tension spring to an extent that the driving chain is not slackened when the bicycle is stopped. The chain, even when subjected to vibrations during the bicycle's running, can withstand the vibrations thanks to the aforesaid rotational resistance, thereby overcoming the problem that slack in the chain caused by the vibrations results in the chain leaving the front gear. Also, the small chain tension ensures that the deflection generated at the support shafts for the front and rear gears resulting from a large tension of the chain is eliminated. As a result, a smaller frictional resistance generated at the relative-rotating portions between the rotary member rotatable together with the front and rear gears and the fixed member supporting the rotary member, can improve the rotational efficiency of the front and rear gears, reduce wear in the relative-rotating portions, and eliminate a loud noise generated thereat.

Furthermore, a change in the tension of the driving chain can be reduced to keep the speed change efficiency in good and stable condition when the chain is switched at a stroke from the highest speed stage to the lowest and vice versa.

The aforesaid construction for applying resistance against the swinging motion of the changeover frame to resist its swinging motion in a direction reverse to the working direction of the tension spring, allows the tension spring to use a coiled spring having a small axial length, whereby a space between the movable member supporting the spring and the changeover frame, can be reduced to make the derailleur compact as a whole.

These and other objects of the invention will become more apparent in the detailed description in connection with the accompanying drawings, in which:

BRIEF DESCRIPTION OF THE DRAWINGS

FIG. 1 is a front vieww of an embodiment of a derailleur of the invention,

FIG. 2 is a partially cutaway bottom view of the FIG. 1 embodiment,

FIG. 3 is a partially enlarged sectional view thereof,

DETAILED DESCRIPTION OF THE INVENTION

Figure 4:
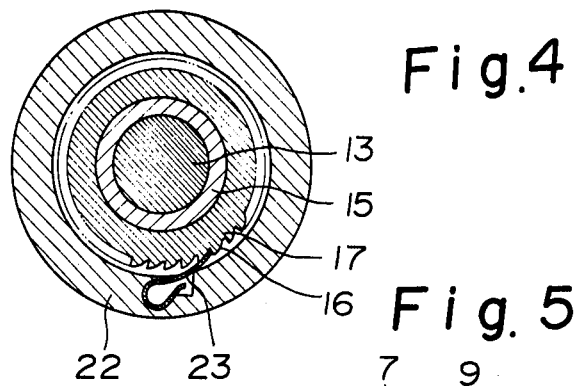
FIG. 4 is a sectional view taken on the line IV—IV in FIG. 3.

A rear derailleur is shown in the drawings, in which reference numeral 1 designates a bracket member fixed to the bicycle frame, and 2 designates a base member mounted on the bracket member 1. Two linkage members 5 and 6 are pivoted to the base member 2 through pins 3 and 4. A movable member 9 is pivoted to the foremost ends of linkage members 5 and 6 through pins 7 and 8. Four members: the base member 1, two linkage members 5 and 6, and movable member 9, construct a linkage mechanism as a derailleur body. A changeover frame 12 having two pulleys 10 and 11 carrying a driving chain C is pivoted to the movable member 9 through a support shaft 13. Between the movable member 9 and the changeover frame 12 is interposed a helically coiled tension spring 14, by which the changeover frame 12 is biased clockwise in FIG. 1, thereby exerting tension on the driving chain C carried by the pulleys 10 and 11.

The derailleur of the invention constructed according to the foregoing is incorporated with resistance applying means which applies to the changeover frame 12 resistance only against its swinging motion in a direction reverse to the working direction of the tension spring 14, whereby the changeover frame 12 moves easily in its swinging motion in the working direction of the tension spring 14 and against resistance in the swinging motion direction reverse to the working direction of the spring 14.

In the rear derailleur shown in FIGS. 2 through 4, a tubular shaft 15 is fixed to the movable member 9 through a fixing means, such as calking, and the support shaft 13 is fixed to the changeover frame 12 by a fixing means, such as calking, and fitted rotatably into the tubular shaft 15. Between the tubular shaft 15 and the changeover frame 12 is provided resistance applying means for applying a resistance to the changeover frame 12 only against its swinging motion in a direction reverse to the working direction of the tension spring 14, thereby making the swinging motion of changeover frame 12 in the working direction of the spring 14 easy and making difficult the swinging motion in a direction reverse to the working direction of the spring 14.

The resistance applying means shown in FIGS. 2 and 4, employs a unidirectional rotational transmission which comprises a rotary member 17 having ratchet teeth 16 and a pawl 23 engageable with the ratchet teeth 16, the transmission being incorporated with a friction plate 18, such as a dish-shaped spring, to apply a rotational resistance to the rotary member 17. The tubular shaft 15 is provided at the outer periphery of its lower end in FIG. 3 with an annular projection 15a, and at the outer periphery and below the annular projection 15a in FIG. 3 with the rotary member 17 and friction plate 18. Washers 19 and 20 are interposed between the annular projection 15a and the friction plate 18 and between the rotary member 17 and a stopper 21 provided at the lower end of support shaft 13 in FIG. 3 respectively, so that the friction plate 18 is pressed on the lateral side of rotary member 17 to apply a frictional resistance against rotation of the rotary member 17. A tubular holder 22 is mounted on the changeover frame 12 and carries at the inner surface the pawl 23 which is formed of a leaf spring and engages at the tip with the ratchet teeth 16. When the changeover frame 12 swings in the working direction of the tension spring 14, the tip of pawl 23 rides over the ratchet teeth 16 to allow the changeover frame 12 to swing freely, thereby not rotating the rotary member 17. On the contrary, when the changeover frame 12 swings in a direction reverse to the working direction of the tension spring 14, the pawl 23 engages with the ratchet teeth 16 to rotate the rotary member 17 following the swinging motion of changeover frame 12, whereby the changeover frame 12 is subjected to resistance against swinging.

In other words, when a spring force of tension spring 14, which biases the changeover frame 12 clockwise in FIG. 1, is represented by F, the changeover frame 12, when swinging in the working direction of the spring 14, is subjected to the force F only, thereby lessening resistance to the swinging motion of changeover frame 12. On the other hand, the changeover frame 12, when swinging in a direction reverse to the working direction of the spring 14, is subjected to a force F+f+FG; the sum of the spring 14 force F, a force f necessary for moving the changeover frame 12 overcoming the force F, and the resistant force FG of rotary member 17, thereby affording resistance to the swinging motion of changeover frame 12.

In addition, in FIGS. 1 and 2, reference numeral 24 designates a holder for a control wire and 25 designates a support for an outer sheath guiding the control wire.

Figure 10:
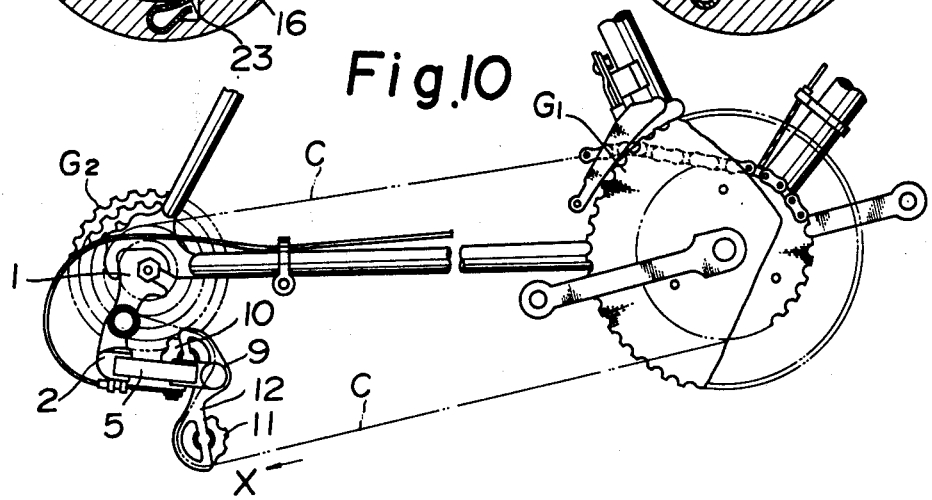
FIG. 10 is a view explanatory of the derailleur of the invention in working condition.

Referring to FIG. 10, the derailleur of the invention constructed as foregoing is supported through the bracket member to the bicycle frame and in the vicinity of the rear gears, the bicycle frame supporting front gears $G_1$ and a plurality of rear gears $G_2$, across which front and rear gears is stretched the driving chain C. The slack side of the driving chain C is carried by the pulleys 10 and 11 and subjected to tension generated by the tension spring 14 which always biases the changeover frame 12 in the direction of the arrow X in FIG. 10.

When the changeover frame 12 swings in the working direction of the tension spring 14 to apply tension to the driving chain, the pawl 23 at the changeover frame 12 rides over the ratchet teeth 16 at the rotary member 17, whereby the changeover frame 12 swings free from the rotary member 17 without being subjected to the resistance thereof. Hence, the changeover frame 12 swings to exert tension on the driving chain C only by the force F.

On the other hand, when the changeover frame 12 is subjected to a force reverse to the working direction of the tension spring 14, the pawl 23 at the changeover frame 12 meshes with one of the ratchet teeth 16 so that the swinging motion of changeover frame 12 is restricted by the rotary member 17. As a result, the changeover frame 12 cannot swing in a direction opposite to the working direction of tension spring 14 unless subjected to a force overcoming the aforesaid force F+f+FG, where F: the force of tension spring 14, f: the force to swing the changeover frame 12 overcoming the force F, and FG: the resistance force of rotary member 17. Hence, the driving chain C, even when the tension spring 14 is weakened, is never slackened from vibrations.

Figure 5:
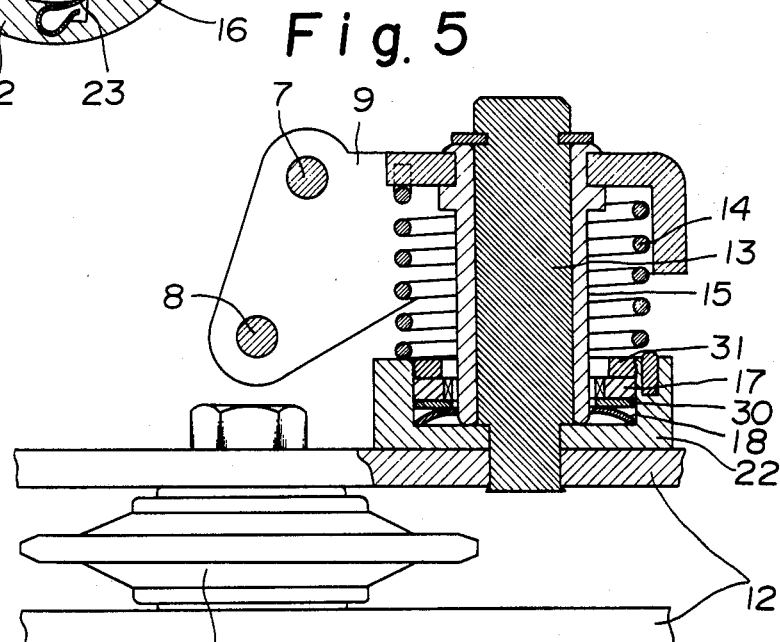
FIGS. 5 through 7 are partially enlarged sectional views of modified embodiments of the invention.

In the arrangement of the aforesaid embodiment, alternatively, the pawl 23 may be supported to the tubular shaft 15, and the rotary member 17 and friction plate 18 to the inner periphery of holder 22 as shown in FIG. 5. In this instance, between the friction plate 18 and the rotary member 17 is interposed a washer 30, and a screw thread is provided at the inner periphery of an open end of the holder 22 and screwed with a nut 31. In addition, the pawl 23 is not shown in FIG. 5, but will be easily understandable from FIGS. 3 and 4.

Figure 6:
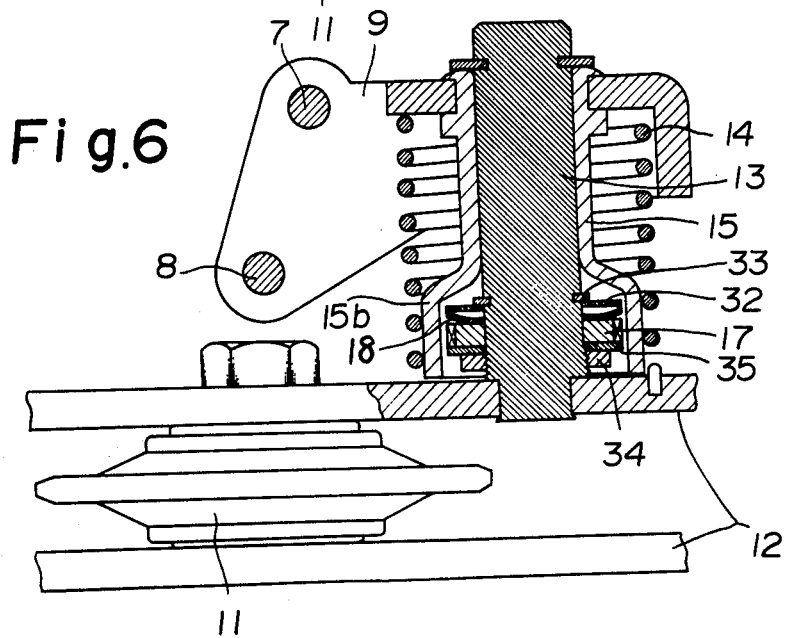

The holder 22 in the aforesaid embodiment, alternatively, may be replaced by a larger diameter portion 15b formed at the foremost axial end of tubular shaft 15 as shown in FIG. 6, so that the rotary member 17 and friction plate 18 are supported to one of the inner periphery of the larger diameter portion 15b and outer periphery of the support shaft 13, and the pawl 23 to the other.

In FIG. 6, the rotary member 17 and friction plate 18 are supported to the outer periphery of support shaft 13, and the pawl 23 to the inner periphery of larger diameter portion 15b. In addition, this arrangement is interchangeable as seen from this drawing.

Furthermore, in FIG. 6, the washer 32 supporting the friction plate 18 is supported to the support shaft 13 by a fixture 33, such as a snap ring, and the support shaft 13 is threaded at its one axial end as shown and a nut 34 is screwed with the thread to support the rotary member 17 through a washer 35.

Figure 7:
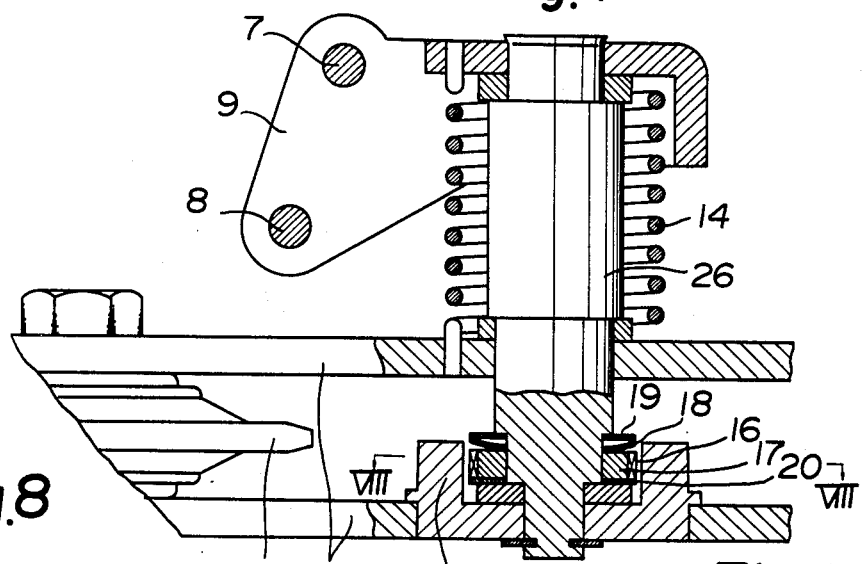
Figure 8:
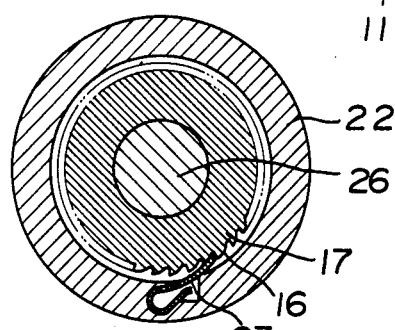
FIG. 8 is a sectional view taken on the line VIII—VIII in FIG. 7.

Also, in the arrangement of the aforesaid embodiment, alternatively, the movable member 9, as shown in FIGS. 7 and 8, may fixedly support a support shaft 26, and the changeover frame 12 is supported swingably to the foremost end of the support shaft 26. A friction plate 18 and a rotary member 17 having ratchet teeth 16 are supported rotatably to one of the support shaft 26 and changeover frame 12, and a pawl 23 engageable with the ratchet teeth 16 is supported to the other, the friction plate 18 press-contacting with the rotary member 17 to apply a resistance thereto.

In FIGS. 7 and 8, the rotary member 17 and friction plate 18 are supported to the support shaft 26, and the pawl 23 to a holder 22 fixed to the changeover frame 12. This arrangement is interchangeable as seen from construction in FIG. 5.

Alternatively, the unidirectionally rotational transmission in the aforesaid embodiments may be replaced by a different types.

Figure 9:
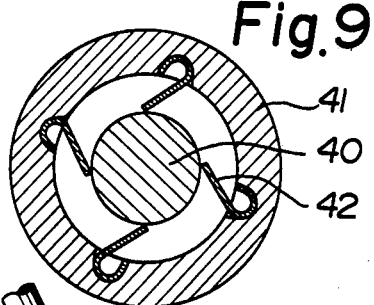
FIG. 9 is a sectional plan view of a principal portion of another modified embodiment of the invention.

Furthermore, instead of the aforesaid unidirectionally rotational transmission, one or a plurality of resistance elements 42, as shown in FIG. 9, may be interposed between the outer periphery of a support shaft 40 mounted on one of the movable members 9 and changeover frame 12 and the inner periphery of a tubular shaft 41 surrounding the support shaft 40 and mounted on the other, the resisters 42 contacting slantwise with the outer periphery of support shaft 40 or the inner periphery of tubular shaft 41 (not shown), so that the swinging motion of changeover frame 12, when in the working direction of tension spring 14, is smaller than when the motion is opposite to the working direction thereof.

In the construction of FIG. 9, each resistance element 42, when formed of a solid material, is supported to the support shaft 40, and a spring energizing the resistance element 42 is interposed between the resistance element 42 and the tubular shaft 41. The resistance element 42, when formed of leaf springs as the same as the pawl 23, can elastically contact by its inherent elasticity with the outer periphery of support shaft 40.

While various embodiments of the invention have been shown and described, the invention is not limited to the specific described construction thereof, which is merely exemplary of the invention rather than limiting.

What is claimed is:

1. A derailleur for a bicycle which changes a driving chain to a desired one of a plurality of chain gears, said derailleur comprising:
    (a) a derailleur body comprising a base member, two linkage members pivoted to said base member, and a movable member pivoted to said linkage members;
    (b) a chain changeover frame having two pulleys and being supported pivotally to said movable member;
    (c) a tension spring interposed between said changeover frame and said movable member for exerting tension on said driving chain;
    (d) a resistance applying means connected between said changeover frame and said movable member for applying a resistance to the swinging movement of said changeover frame relative to said movable member only when said changeover frame swings in a direction opposite to a working direction of said tension spring acting on said changeover frame, so that said changeover frame swings in said working direction against less applied resistance than that existing when said changeover frame swings in a direction opposite to said working direction.

2. A derailleur for a bicycle according to claim 1, wherein said resistance applying means includes a unidirectional rotational transmitting mechanism provided between said changeover frame and said movable member supporting said changeover frame.

3. A derailleur for a bicycle according to claim 2, wherein said unidirectional rotational transmitting mechanism comprises a rotary member having engaging recesses, an engaging member engageable unidirectionally with said engaging recesses; and a friction means for applying a resistance against rotation of said rotary member; said rotary member being mounted on one of said changeover frame and movable member, said engaging member being mounted on the other.

4. A derailleur for a bicycle according to claim 3, wherein said movable member has a tubular shaft for swingably supporting said changeover frame, said changeover frame having a support shaft fitted into said tubular shaft and a cylindrical holder disposed opposite thereto, so that said rotary member is supported to one of an outer periphery of said tubular shaft and an inner periphery of said holder, and said engaging member is supported on the other.

5. A derailleur for a bicycle according to claim 3, wherein said movable member has a tubular shaft for swingably supporting said changeover frame, said changeover frame having a support shaft fitted into said tubular shaft, said tubular shaft having a larger diameter portion, so that said rotary member is supported on one of an inner periphery of said larger diameter portion and an outer periphery of said support shaft opposite to said larger diameter portion, and said engaging member is supported on the other.

6. A derailleur for a bicycle according to claim 3, wherein said movable member has a support shaft swingably supporting said changeover frame, said changeover frame having a cylindrical holder disposed opposite to said support shaft, so that said rotary member is supported on one of an outer periphery of said support shaft and an inner periphery of said holder, and said engaging member is supported on the other.

7. A derailleur for a bicycle according to claim 3, wherein said engaging recesses are formed in ratchet teeth and said engaging member is a pawl.

8. A derailleur for a bicycle according to claim 1, wherein a support shaft is fixed to one of said movable member and changeover frame, and a tubular shaft opposite to said support shaft is fixed to the other, so that between an outer periphery of said support shaft and an inner periphery of said tubular shaft are interposed resister elements each applying a resistance to said changeover frame against its swinging motion in a direction opposite to the working direction of said tension spring.

* * * * *